US010374483B1

(12) United States Patent
Dai et al.

(10) Patent No.: US 10,374,483 B1
(45) Date of Patent: Aug. 6, 2019

(54) THREE-AXIS GIMBAL ASSEMBLY WITH A SPHERICAL MOTOR

(71) Applicant: HONEYWELL INTERNATIONAL INC., Morris Plains, NJ (US)

(72) Inventors: Jason Dai, Shanghai (CN); Pablo Bandera, Avondale, AZ (US); Peter Yang, Shanghai (CN); Yonghui Zhang, Shanghai (CN); Jing Wang, Shanghai (CN); Qiang Li, Shanghai (CN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/035,912

(22) Filed: Jul. 16, 2018

(51) Int. Cl.
*H02K 7/14* (2006.01)
*H02K 3/28* (2006.01)
*G03B 15/00* (2006.01)
*G03B 17/56* (2006.01)
*F16M 11/14* (2006.01)
*F16M 11/18* (2006.01)
*F16M 13/02* (2006.01)
(Continued)

(52) U.S. Cl.
CPC ............... *H02K 7/14* (2013.01); *B64D 47/08* (2013.01); *F16M 11/14* (2013.01); *F16M 11/18* (2013.01); *F16M 13/022* (2013.01); *G03B 15/006* (2013.01); *G03B 17/561* (2013.01); *H02K 3/28* (2013.01); *B64C 39/024* (2013.01); *B64C 2201/127* (2013.01); *H02K 2201/18* (2013.01)

(58) Field of Classification Search
None
See application file for complete search history.

(56) References Cited

U.S. PATENT DOCUMENTS 5,413,010 A * 5/1995 Nakanishi ......... B01F 15/00435 310/156.38
8,559,802 B1 * 10/2013 McClatchie ......... G03B 15/006 396/13
9,893,574 B2 2/2018 Bandera
(Continued)

FOREIGN PATENT DOCUMENTS

CN 102412763 A 4/2012
WO 2017145051 A1 8/2017

OTHER PUBLICATIONS

Kim, H., et al.; Design of a New Type Multi Degree of Freedom Spherical Actuator; Retrieved from Internet [www.aspe.net].

*Primary Examiner* — William B Perkey
(74) *Attorney, Agent, or Firm* — Lorenz & Kopf, LLP

(57) ABSTRACT

A multi-axis gimbal assembly includes a spherical armature, a first coil, a second coil, a third coil, a bracket, a stator, and a motor. The spherical armature has first, second, and third perpendicularly disposed axes of symmetry. The first coil is wound about the first axis of symmetry, the second coil is wound about the second axis of symmetry, and the third coil is wound about the third axis of symmetry. The bracket is rotationally coupled to the spherical armature to allow relative rotation between the spherical armature and bracket around only the first axis of symmetry. The stator is rotationally coupled to the bracket to allow relative rotation between the stator and bracket around only the second axis of symmetry. The motor is coupled to the stator and is configured to simultaneously rotate the stator, the bracket, and the spherical armature around the third axis of symmetry.

20 Claims, 6 Drawing Sheets

(51) Int. Cl.

| | |
|---|---|
| ***B64C 39/02*** | (2006.01) |
| ***B64D 47/08*** | (2006.01) |

(56) References Cited

U.S. PATENT DOCUMENTS

| | | | | |
|---|---|---|---|---|
| 10,053,230 | B2 * | 8/2018 | Tian | B64D 47/08 |
| 10,070,026 | B2 * | 9/2018 | Tian | B64D 47/08 |
| 2012/0276844 | A1 * | 11/2012 | Goossen | F16M 11/126 455/41.1 |
| 2014/0125824 | A1 * | 5/2014 | Takizawa | G03B 5/00 348/208.3 |
| 2014/0191626 | A1 | 7/2014 | Hollis, Jr. et al. | |
| 2017/0227162 | A1 | 8/2017 | Saika et al. | |
| 2018/0019627 | A1 | 1/2018 | Bandera | |
| 2018/0246394 | A1 * | 8/2018 | Zhang | G03B 15/006 |

* cited by examiner

THREE-AXIS GIMBAL ASSEMBLY WITH A SPHERICAL MOTOR

TECHNICAL FIELD

The present invention generally relates to gimbal assemblies, and more particularly relates to a multi-axis gimbal assembly that includes a spherical motor.

BACKGROUND

The use of unmanned aerial vehicle (UAVs) is becoming increasingly prevalent. Various industries, including military, logistic, and even consumer industries are finding more and more use for UAVs. One of the many components included on most UAVs is a camera, which is typically mounted on a gimbal assembly. Typically, a UAV-mounted gimbal assembly is driven by three direct current (DC) motors so that it can rotate freely along three axes. Unfortunately, the three DC motors results in a relative large, and relatively costly design.

Hence, there is a need for multi-axis gimbal assembly that is relatively small and inexpensive, as compared to known designs, and that allow a camera to be readily mounted thereon. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a multi-axis gimbal assembly includes a spherical armature, a first coil, a second coil, a third coil, a bracket, a stator, and a motor. The spherical armature has an inner surface, an outer surface, a first axis of symmetry, a second axis of symmetry, and a third axis of symmetry. The inner surface defines a cavity, and the first, second, and third axes of symmetry disposed perpendicular to each other. The first coil is wound on the spherical armature about the first axis of symmetry, the second coil is wound on the spherical armature about the second axis of symmetry, and the third coil is wound on the spherical armature about the third axis of symmetry. The bracket is rotationally coupled to the spherical armature to allow relative rotation between the spherical armature and the bracket around only the first axis of symmetry. The stator is spaced apart from the spherical armature and includes a magnet that emanates a magnetic field. The stator is rotationally coupled to the bracket to allow relative rotation between the stator and the bracket and spherical armature around only the second axis of symmetry. The motor is coupled to the stator and is configured to simultaneously rotate the stator, the bracket, and the spherical armature around the third axis of symmetry. Rotation of the spherical armature around the first and second axes of symmetry is controlled in response to current magnitudes and directions in one or more of the first, second, and third coils.

In another embodiment, a multi-axis gimbal assembly includes a spherical armature, a first coil, a second coil, a third coil, a bracket, a stator, a camera assembly, and a DC motor. The spherical armature has an inner surface, an outer surface, a first axis of symmetry, a second axis of symmetry, and a third axis of symmetry. The inner surface defines a cavity, and the first, second, and third axes of symmetry disposed perpendicular to each other. The first coil is wound on the spherical armature about the first axis of symmetry, the second coil is wound on the spherical armature about the second axis of symmetry, and the third coil is wound on the spherical armature about the third axis of symmetry. The bracket is rotationally coupled to the spherical armature to allow relative rotation between the spherical armature and the bracket around only the first axis of symmetry. The stator is spaced apart from the spherical armature and includes a magnet that emanates a magnetic field. The stator is rotationally coupled to the bracket to allow relative rotation between the stator and the bracket and spherical armature around only the second axis of symmetry. The camera assembly is disposed at least partially within the cavity of the spherical armature. The DC motor is coupled to the stator and is configured to simultaneously rotate the stator, the bracket, and the spherical armature around the third axis of symmetry. The rotation of the spherical armature around the first and second axes of symmetry is controlled in response to current magnitudes and directions in one or more of the first, second, and third coils.

In yet another embodiment, a machine includes an unmanned air vehicle (UAV) and a multi-axis gimbal assembly coupled to the UAV. The multi-axis gimbal assembly includes a spherical armature, a first coil, a second coil, a third coil, a bracket, a stator, and a motor. The spherical armature has an inner surface, an outer surface, a first axis of symmetry, a second axis of symmetry, and a third axis of symmetry. The inner surface defines a cavity, and the first, second, and third axes of symmetry disposed perpendicular to each other. The first coil is wound on the spherical armature about the first axis of symmetry, the second coil is wound on the spherical armature about the second axis of symmetry, and the third coil is wound on the spherical armature about the third axis of symmetry. The bracket is rotationally coupled to the spherical armature to allow relative rotation between the spherical armature and the bracket around only the first axis of symmetry. The stator is spaced apart from the spherical armature and includes a magnet that emanates a magnetic field. The stator is rotationally coupled to the bracket to allow relative rotation between the stator and the bracket and spherical armature around only the second axis of symmetry. The motor is coupled to the stator and is configured to simultaneously rotate the stator, the bracket, and the spherical armature around the third axis of symmetry. Rotation of the spherical armature around the first and second axes of symmetry is controlled in response to current magnitudes and directions in one or more of the first, second, and third coils.

Furthermore, other desirable features and characteristics of the gimbal assembly will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
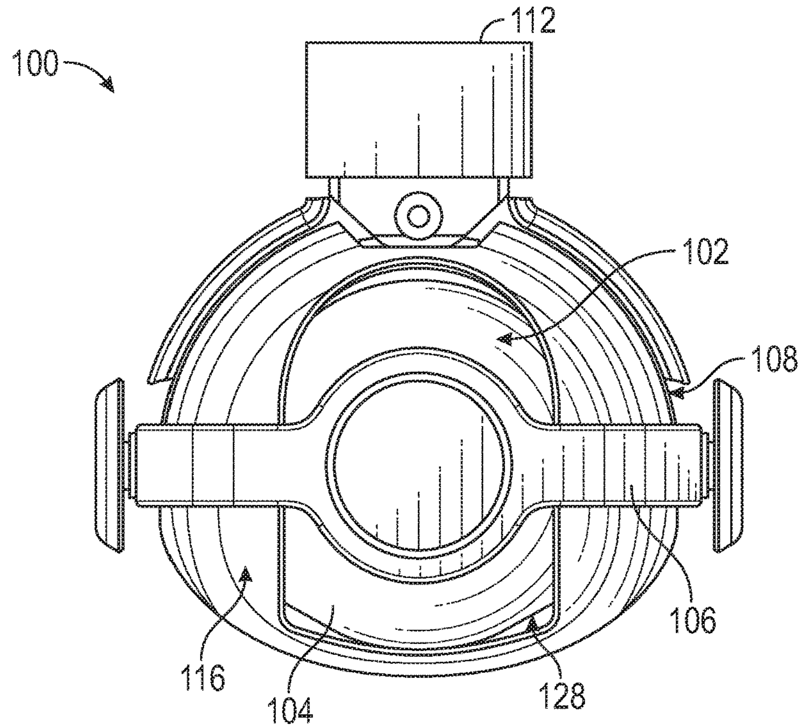
FIGS. 1-4 depict side, front, top, and exploded views, respectively, of one embodiment of a multi-axis gimbal assembly.
Figure 2:
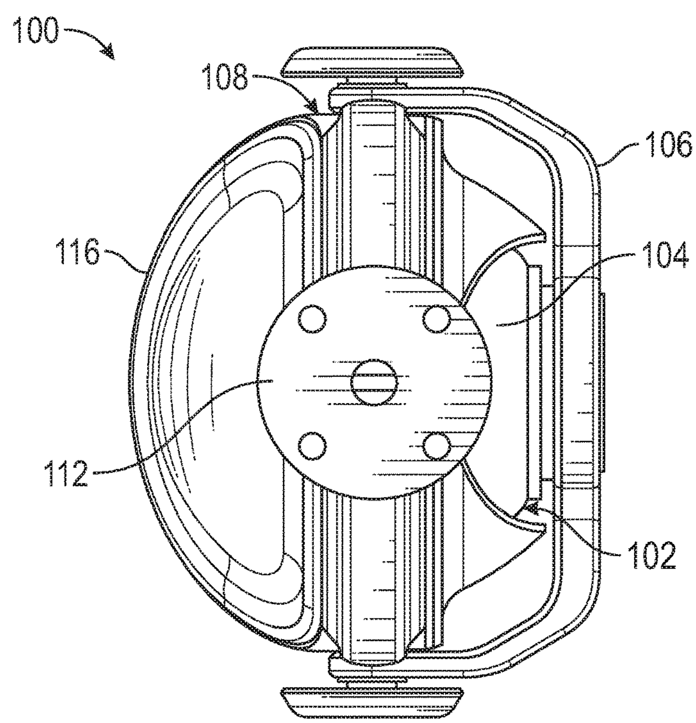
Figure 3:
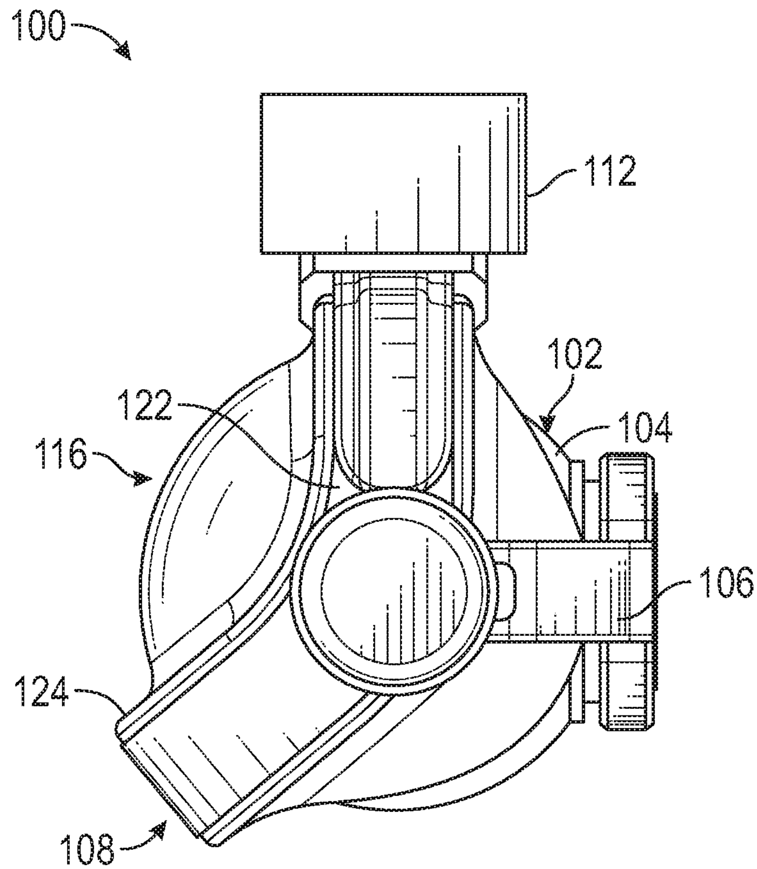

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Referring first to FIGS. 1-4, side, front, top, and exploded views, respectively, of one embodiment of a multi-axis gimbal assembly 100 are depicted. The gimbal assembly includes at least a spherical armature 102, a plurality of coils 104, a bracket 106, a stator 108, and a motor 112. As will be described further below, the gimbal assembly 100 may also include, as illustrated most clearly in FIG. 4, a camera assembly 114 and an armature cover assembly 116.

Figure 5:
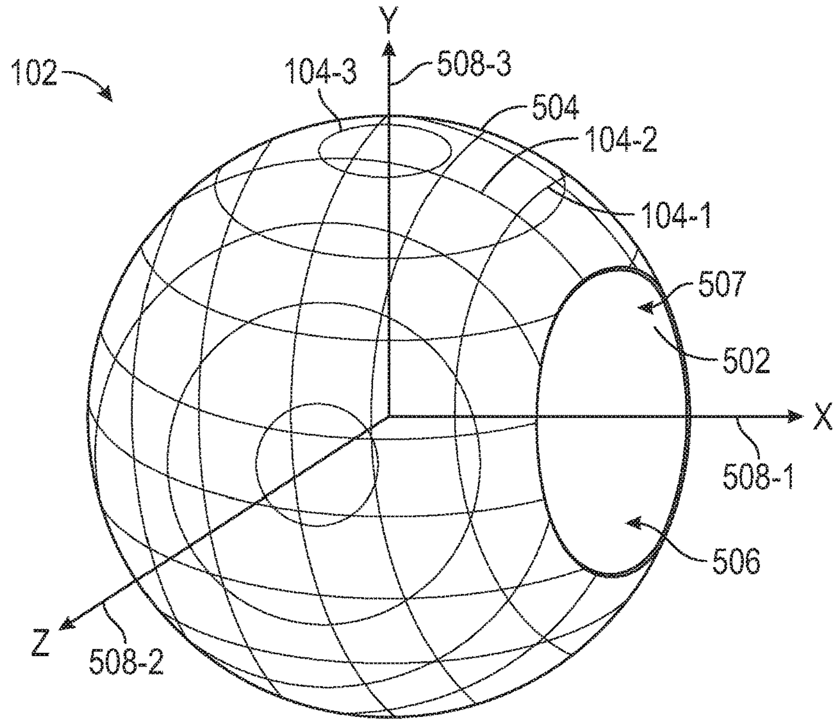
FIG. 5 depicts a perspective view of an embodiment of a spherical armature with orthogonally arranged windings disposed thereon.

With reference now to FIG. 5, it is seen that the spherical armature 102 includes an inner surface 502 and an outer surface 504, where the inner surface 502 defines a cavity 506. As FIG. 5 further depicts, the spherical armature 102 may additionally include an opening 507. The purpose of the opening 507 is discussed further below. By virtue of its shape, the spherical armature 102 has three perpendicularly disposed axes of symmetry 508—a first axis of symmetry 508-1, a second axis of symmetry 508-2, and a third axis of symmetry 508-3. It should be noted that a sphere has an infinite number of axes of symmetry. Thus, the first, second, and third axes of symmetry 508-1, 508-2, 508-3, could be any one of these axes of symmetry, so long as all three axes of symmetry are perpendicular to each other.

With continued reference to FIG. 5, the plurality of coils 104 comprise three coils—a first coil 104-1, a second coil 104-2, and a third coil 104-3. The first coil 104-1 is wound on the spherical armature 102 about the first axis of symmetry 508-1, the second coil 104-2 is wound on the spherical armature 102 about the second axis of symmetry 508-2, and the third coil 104-3 is wound on the spherical armature 102 about the third axis of symmetry 508-3. It will be appreciated that the coils 104 are each formed of any one of numerous types and shapes of electrically conductive materials, and may be implemented using one or a plurality of these conductive materials. It will additionally be appreciated that the coils 104 may each be implemented using single, discrete contiguous conductors, or using a plurality of conductors, and may be formed, for example, using additive (e.g., printed conductors) or subtractive (e.g., PWB etching) techniques, and may be conductive wires, ribbons, or sheets, just to name a few non-limiting examples.

Returning again to FIGS. 1-4, the bracket 106 is rotationally coupled to the spherical armature 102 and to the stator 106. In particular, the bracket 106 is rotationally coupled to the spherical armature 102 in a manner that allows relative rotation between the spherical armature 102 and the bracket 106 around only the first axis of symmetry 508-1. To do so, at least in the depicted embodiment, the gimbal assembly additionally includes a shaft 402 and a bearing assembly 404. The shaft 402 extends into the cavity 506, and the bearing assembly 404 is disposed between the bracket and the shaft 402 to allow the relative rotation between the spherical armature 102 and the bracket 106.

The stator 108, which preferably comprises a magnetically permeable material such as, for example, iron or an iron alloy, is spaced apart from the spherical armature 102 and includes at least one a magnet 406 that emanates a magnetic field. The stator 108 is rotationally coupled to the bracket 106, via suitable hardware, in a manner that allows relative rotation between the stator 108 and the bracket 106 and spherical armature 102 around only the second axis of symmetry 508-2. Although the stator 108 may be variously configured, in the depicted embodiment, and as FIGS. 1 and 4 most clearly depict, it is configured to include a first stator section 122 and a second stator section 124. The first stator section 122 extends perpendicularly from the motor 112, and the second stator 124 section extends from the first stator section 122 at a predetermined, non-perpendicular angle ($\alpha$). Although the predetermined, non-perpendicular angle ($\alpha$) may vary, in the depicted embodiment it is about 30-degrees ($\pi/6$ rad).

Figure 6:
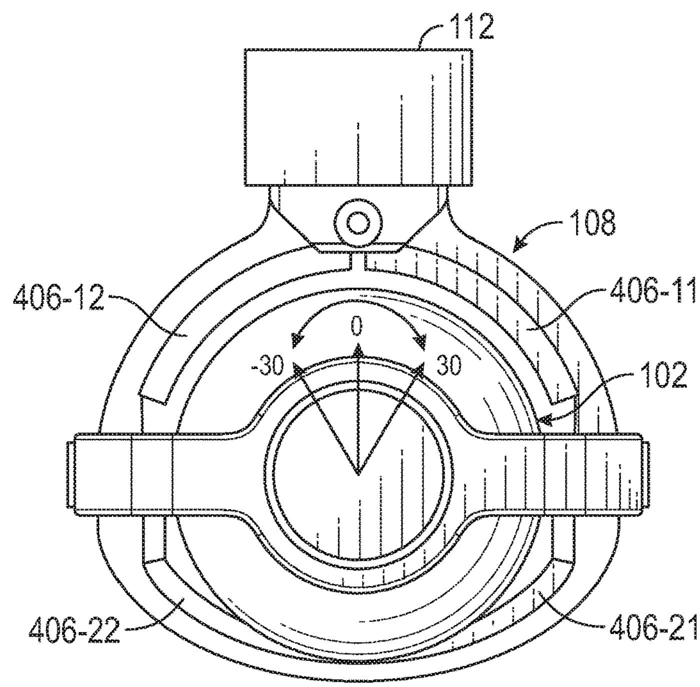
FIGS. 6-8 depict front, top, and side views, respectively, of the multi-axis gimbal assembly of FIGS. 1-3 with the cover assembly removed.
Figure 7:
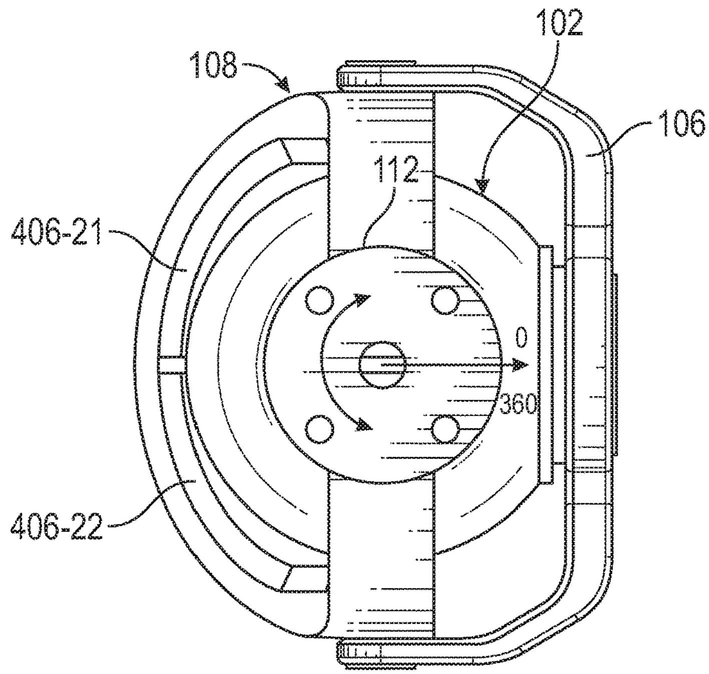

In the depicted embodiment, as shown more clearly in FIGS. 6 and 7, the stator 108 includes a plurality of magnets 406. More specifically, it includes a plurality of first permanent magnets 406-11, 406-12, and a plurality of second permanent magnets 406-21, 406-22. The first permanent magnets 406-11, 406-12 are each coupled to, and extend inwardly from, the first stator section 122, and the second permanent magnets 406-21, 406-22 are each coupled to, and extend inwardly from, the second stator section 124. It will be appreciated that although the depicted embodiment includes four magnets 406, the gimbal assembly 100 could be implemented with more or less than this number of magnets. It will additionally be appreciated that the magnets 406 may be variously shaped and dimensioned. For example, in the depicted embodiment the magnets 406 are generally arc-shaped, but in other embodiments the magnets 406 may be semi-spherically shaped, or any one of numerous other shapes if needed or desired. It will additionally be appreciated that the arc length of the magnets 406 may be varied, and that the magnets 406 may be permanent magnets or, if needed or desired, electromagnets.

Moreover, while the portion of the magnets 406 that face the spherical armature 102 are preferably, for efficiency, contoured similar to the spherical armature 102, these portions need not be so contoured. In the depicted embodiment, for example, the magnets 406 are each coupled to, and extend inwardly from, an inner surface of the stator 108. In other embodiments, the magnets 406 may be integrally formed as part of the stator 108, or may be formed separately but surrounded by at least a portion of the stator 108.

In the depicted embodiment, the magnets 406 are disposed such that the magnetic pole facing the spherical armature 102 is spaced apart therefrom by a predetermined gap. The gap, when included, is preferably small enough to minimize losses, which increases the magnetic efficiency by reducing magnetic reluctance. A relatively larger gap may allow for a more cost-effective design by loosening mechanical tolerances. In other embodiments, the magnets 406 may be disposed such that the magnetic pole contacts the spherical armature 102. In such embodiments, the material selection of the contacting surfaces is chosen in consideration of wear and frictional losses, as is known in the art.

Regardless of its shape, dimension, configuration, and implementation, each magnet 406 emanates a magnetic field, and each is preferably arranged such that the polarity of the first magnets 406-11, 406-12 relative to the spherical armature 102 is opposite to the polarity of the second magnets 406-21, 406-22. For example, if the north pole (N) of the first magnets 406-11, 406-12 is disposed closer to the spherical armature 102, then the south pole (S) of the second magnets 406-21, 406-22 will be disposed closer to the spherical armature 102, and vice-versa.

Returning once again to FIGS. 1-4, the motor 112 is coupled to the stator 108, and is configured to rotate the stator 108 around the third axis of symmetry 508-3. More specifically, because of how the components are coupled together, the motor 112 is configured to simultaneously rotate the stator 108, the bracket 106, and the spherical armature 102 around the third axis of symmetry 508-3. Although the motor 112 may be variously implemented, in the depicted embodiment it is implemented using a direct current (DC) motor.

Figure 4:
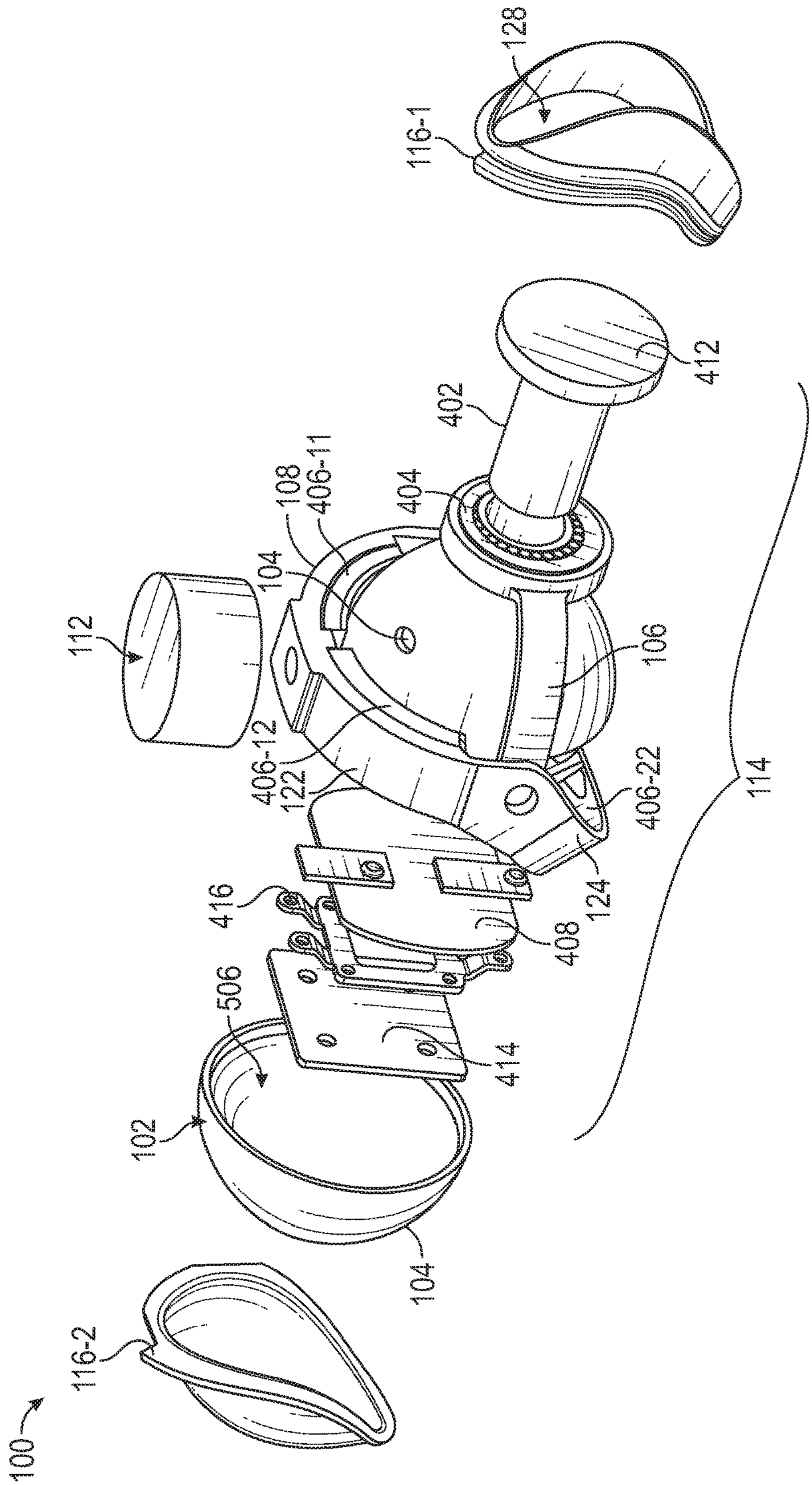

As was previously noted, the gimbal assembly 100 may additionally include a camera assembly 114 and an armature cover assembly 116. The camera assembly 114, when included, is disposed at least partially within the cavity 506 of the spherical armature 102. The camera assembly 114 may be variously configured and implemented, but in the depicted embodiment, and as FIG. 4 illustrates, it includes a camera 408 and a lens 412. The camera 412, which may be mounted, for example, on a printed circuit board 416 via suitable mount hardware 418, may be variously implemented, but in the depicted embodiment it comprises a complementary metal-oxide semiconductor (CMOS) camera. The camera receives optical images from the lens 412, which is disposed adjacent to the opening 507.

The armature cover assembly 116 is coupled to the stator 108 and surrounds at least a portion of the spherical armature 102. In the depicted embodiment, the armature cover assembly 116 includes a front cover 116-1 and a back cover 116-2. The front cover 116-1 includes an opening 128, through which the lens 414 extends. The back cover 116-1 completely encapsulates the back end of the spherical armature 102.

The configuration of the magnets 406 and the first, second, and third coils 104-1, 104-2, 104-2 is such that magnetic flux travels from the one plurality of magnets into the spherical armature 102 on one side and back out on the other side to the other plurality of magnets. The magnetic flux travels through the first, second, and third coils 104-1, 104-2, 104-2, and the armature 108 provides the return path for the magnetic flux. As may be appreciated, when direct current (DC) is supplied to one or more of the first, second, and third coils 104-1, 104-2, 104-2, a Lorentz force is generated between the energized coils 104-1, 104-2, 104-2 and the magnets 406, which in turn generates in a torque about one or both of the first and second axes symmetry of 508-1, 508-2. The direction of the generated torque, as may also by appreciated, is based on the direction of the current flow in the first, second, and third coils 104-1, 104-2, 104-2.

Figure 8:
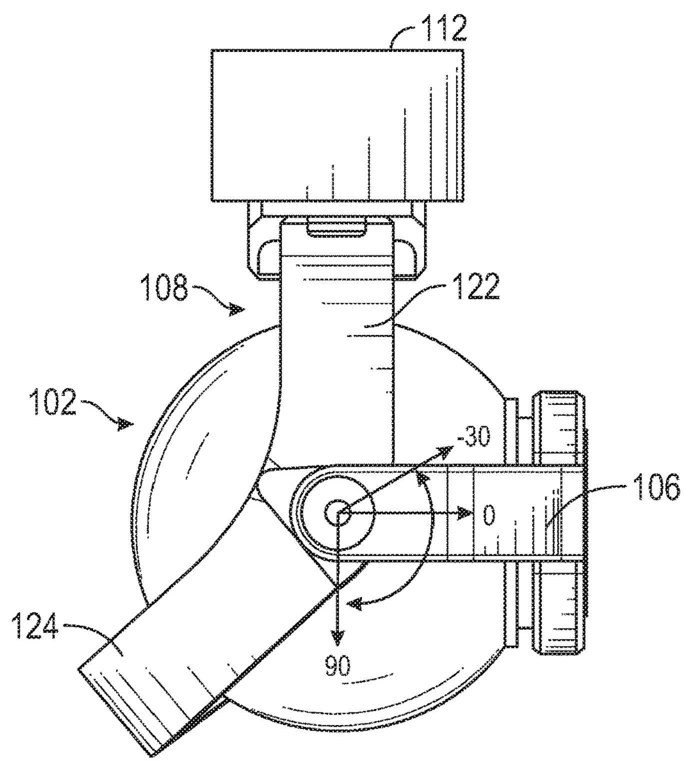

Because of manner in which the spherical armature 102 and the stator 108 are mounted, the torque that is generated will cause the spherical armature 102 to move relative to the stator 108. Indeed, the rotation of the spherical armature 102 around the first and second axes of symmetry 508-1, 508-2 is controlled in response to current magnitudes and directions in one or more of the first, second, and third coils 104-1, 104-2, 104-2. Moreover, as FIGS. 6-8 depict, because of the above-described configurations of the spherical armature 102, the bracket 106, the stator 108, and the motor 112, the amount of rotation around each of the axes of symmetry 508 varies. Specifically, the relative rotation between the spherical armature 102 and the bracket 106 around the first axis of symmetry 508-1 spans approximately 60-degrees ($\pi/3$ rad) (see FIG. 6), and the relative rotation between the stator 108 and the bracket 106 and spherical armature 102 around the second axis of symmetry 508-1 spans approximately 120-degrees ($2\pi/3$ rad) (see FIG. 7), and the stator, the bracket, and the spherical armature are rotatable 360-degrees ($2\pi$ rad) around the third axis of symmetry 508-3 (see FIG. 8).

Figure 9:
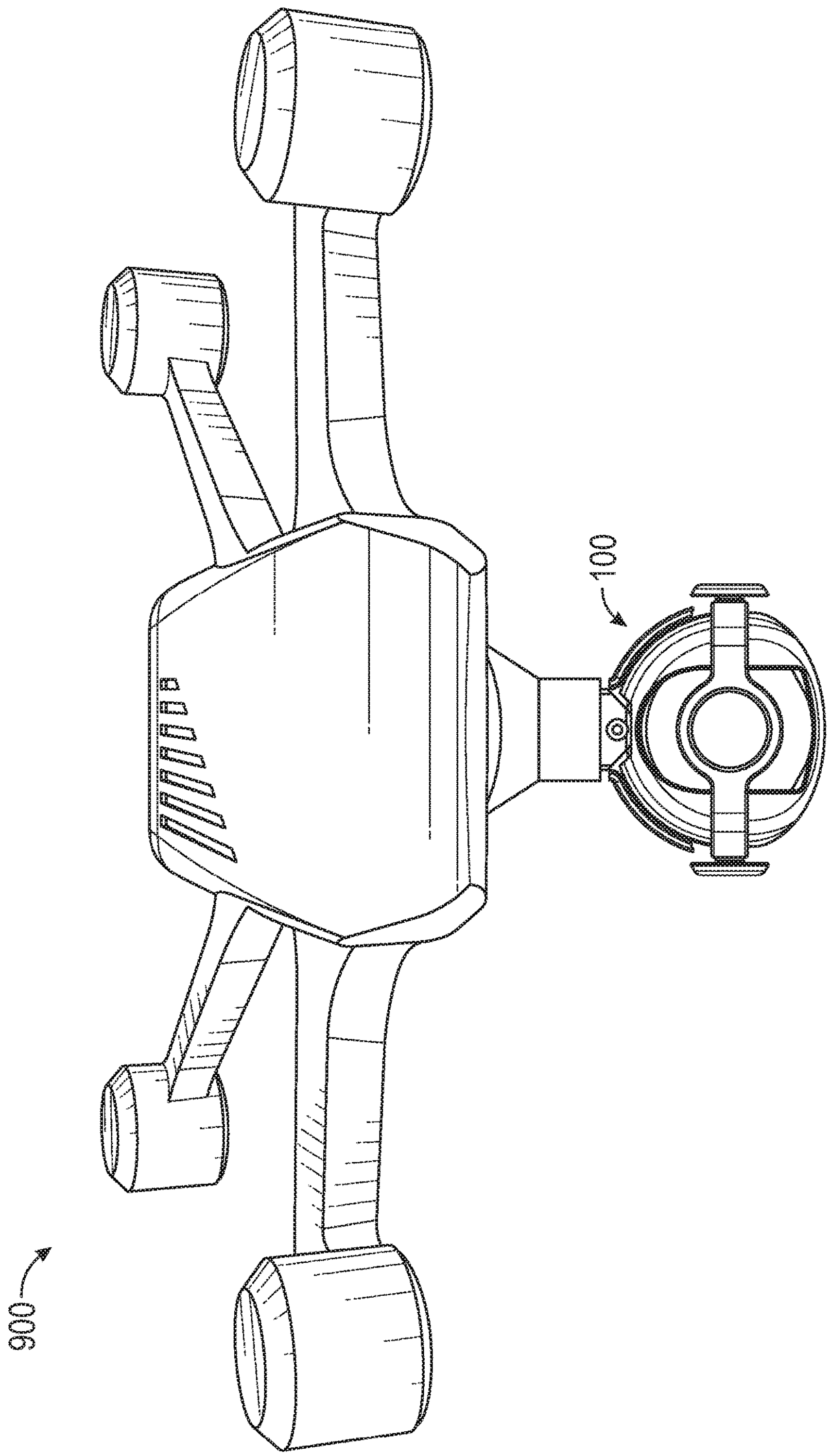
FIG. 9 depicts one embodiment of an unmanned aerial vehicle (UAV) having the multi-axis gimbal assembly mounted thereon.

The multi-axis gimbal assembly 100 depicted in FIGS. 1-8 and described above may be used with numerous vehicles and devices. In one embodiment, which is depicted in FIG. 9, the multi-axis gimbal assembly 100 is mounted on an unmanned aerial vehicle (UAV) 900.

The multi-axis gimbal assembly 100 described herein is relatively small and inexpensive, as compared to known designs, and allows a camera to be readily mounted thereon.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-axis gimbal assembly, comprising:

a spherical armature having an inner surface, an outer surface, a first axis of symmetry, a second axis of symmetry, and a third axis of symmetry, the inner surface defining a cavity, the first, second, and third axes of symmetry disposed perpendicular to each other;

a first coil wound on the spherical armature about the first axis of symmetry;

a second coil wound on the spherical armature about the second axis of symmetry;

a third coil wound on the spherical armature about the third axis of symmetry;

a bracket rotationally coupled to the spherical armature to allow relative rotation between the spherical armature and the bracket around only the first axis of symmetry;

a stator spaced apart from the spherical armature and including a magnet that emanates a magnetic field, the stator rotationally coupled to the bracket to allow relative rotation between the stator and the bracket and spherical armature around only the second axis of symmetry; and a motor coupled to the stator and configured to simultaneously rotate the stator, the bracket, and the spherical armature around the third axis of symmetry, wherein rotation of the spherical armature around the first and second axes of symmetry is controlled in response to current magnitudes and directions in one or more of the first, second, and third coils.

2. The gimbal assembly of claim 1, further comprising:

a camera assembly disposed at least partially within the cavity of the spherical armature.

3. The gimbal assembly of claim 2, wherein:

the spherical armature further includes an opening;

the camera assembly comprises a camera and a lens; and the lens is disposed adjacent to the opening.

4. The gimbal assembly of claim 3, wherein the camera comprises a complementary metal-oxide semiconductor (CMOS) camera.

5. The gimbal assembly of claim 3, further comprising:

a shaft coupled to the lens and extending into the cavity; and a bearing assembly disposed between the bracket and the shaft to allow the relative rotation between the spherical armature and the bracket.

6. The gimbal assembly of claim 1, wherein the motor comprises a direct current (DC) motor.

7. The gimbal assembly of claim 1, wherein:

the stator comprises a first stator section and a second stator section;

the first stator section extends perpendicularly from the motor; and the second stator section extends from the first stator section at a predetermined, non-perpendicular angle.

8. The gimbal assembly of claim 7, wherein the predetermined, non-perpendicular angle is about 30-degrees ($\pi/6$ rad).

9. The gimbal assembly of claim 7, wherein:

the magnet comprises a plurality of first permanent magnets and a plurality of second permanent magnets;

the first permanent magnets are each coupled to the first stator section; and the second permanent magnets are each coupled to the second stator section.

10. The gimbal assembly of claim 1, further comprising:

an armature cover assembly coupled to the stator and surrounding at least a portion of the spherical armature.

11. The gimbal assembly of claim 1, wherein:

the relative rotation between the spherical armature and the bracket around the first axis of symmetry spans approximately 60-degrees ($\pi/3$ rad);

the relative rotation between the stator and the bracket and spherical armature around the second axis of symmetry spans approximately 120-degrees ($2\pi/3$ rad); and the stator, the bracket, and the spherical armature are rotatable 360-degrees ($2\pi$ rad) around the third axis of symmetry.

12. A multi-axis gimbal assembly, comprising:

a spherical armature having an inner surface, an outer surface, a first axis of symmetry, a second axis of symmetry, and a third axis of symmetry, the inner surface defining a cavity, the first, second, and third axes of symmetry disposed perpendicular to each other;

a first coil wound on the spherical armature about the first axis of symmetry;

a second coil wound on the spherical armature about the second axis of symmetry;

a third coil wound on the spherical armature about the third axis of symmetry;

a bracket rotationally coupled to the spherical armature to allow relative rotation between the spherical armature and the bracket around only the first axis of symmetry;

a stator spaced apart from the spherical armature and including a magnet that emanates a magnetic field, the stator rotationally coupled to the bracket to allow relative rotation between the stator and the bracket and spherical armature around only the second axis of symmetry;

a camera assembly disposed at least partially within the cavity of the spherical armature; and a DC motor coupled to the stator and configured to simultaneously rotate the stator, the bracket, and the spherical armature around the third axis of symmetry, wherein rotation of the spherical armature around the first and second axes of symmetry is controlled in response to current magnitudes and directions in one or more of the first, second, and third coils.

13. The gimbal assembly of claim 10, wherein:

the spherical armature further includes an opening;

the camera assembly comprises a camera and a lens; and the lens is disposed adjacent to the opening.

14. The gimbal assembly of claim 11, wherein the camera comprises a complementary metal-oxide semiconductor (CMOS) camera.

15. The gimbal assembly of claim 11, further comprising:

a shaft coupled to the lens and extending into the cavity; and a bearing assembly disposed between the bracket and the shaft to allow the relative rotation between the spherical armature and the bracket.

16. The gimbal assembly of claim 10, wherein:

the stator comprises a first stator section and a second stator section;

the first stator section extends perpendicularly from the motor;

the second stator section extends from the first stator section at a predetermined, non-perpendicular angle; and the predetermined, non-perpendicular angle is about 30-degrees ($\pi/6$ rad).

17. The gimbal assembly of claim 14, wherein:

the magnet comprises a plurality of first permanent magnets and a plurality of second permanent magnets;

the first permanent magnets are each coupled to the first stator section; and the second permanent magnets are each coupled to the second stator section.

18. The gimbal assembly of claim 10, further comprising:

an armature cover assembly coupled to the stator and surrounding at least a portion of the spherical armature.

19. The gimbal assembly of claim 10, wherein:

the relative rotation between the spherical armature and the bracket around the first axis of symmetry spans approximately 60-degrees (π/3 rad);

the relative rotation between the stator and the bracket and spherical armature around the second axis of symmetry spans approximately 120-degrees (π/3 rad); and the stator, the bracket, and the spherical armature are rotatable 360-degrees (2π rad) around the third axis of symmetry.

20. A machine, comprising:

an unmanned air vehicle (UAV); and a multi-axis gimbal assembly coupled to the UAV, the multi-axis gimbal assembly comprising:

a spherical armature having an inner surface, an outer surface, a first axis of symmetry, a second axis of symmetry, and a third axis of symmetry, the inner surface defining a cavity, the first, second, and third axes of symmetry disposed perpendicular to each other;

a first coil wound on the spherical armature about the first axis of symmetry;

a second coil wound on the spherical armature about the second axis of symmetry;

a third coil wound on the spherical armature about the third axis of symmetry;

a bracket rotationally coupled to the spherical armature to allow relative rotation between the spherical armature and the bracket around only the first axis of symmetry;

a stator spaced apart from the spherical armature and including a magnet that emanates a magnetic field, the stator rotationally coupled to the bracket to allow relative rotation between the stator and the bracket and spherical armature around only the second axis of symmetry;

a camera assembly disposed at least partially within the cavity of the spherical armature; and a motor coupled to the stator and configured to simultaneously rotate the stator, the bracket, and the spherical armature around the third axis of symmetry, wherein rotation of the spherical armature around the first and second axes of symmetry is controlled in response to current magnitudes and directions in one or more of the first, second, and third coils.

* * * * *